May 1, 1934.  K. LARSON  1,957,346
FRUIT JUICE EXTRACTOR
Filed May 28, 1932
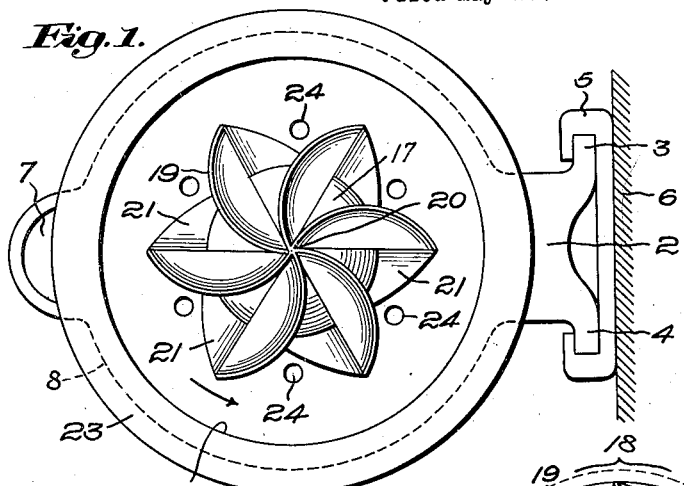
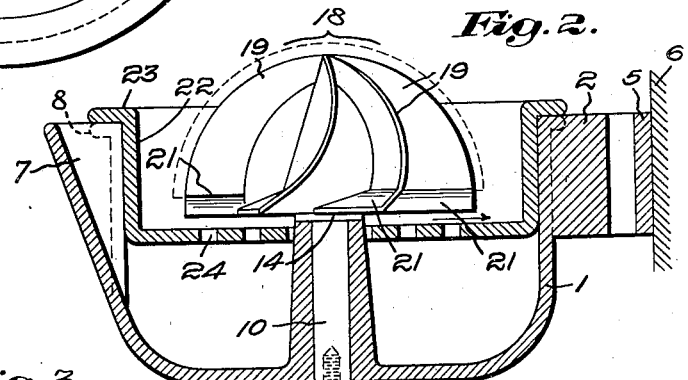
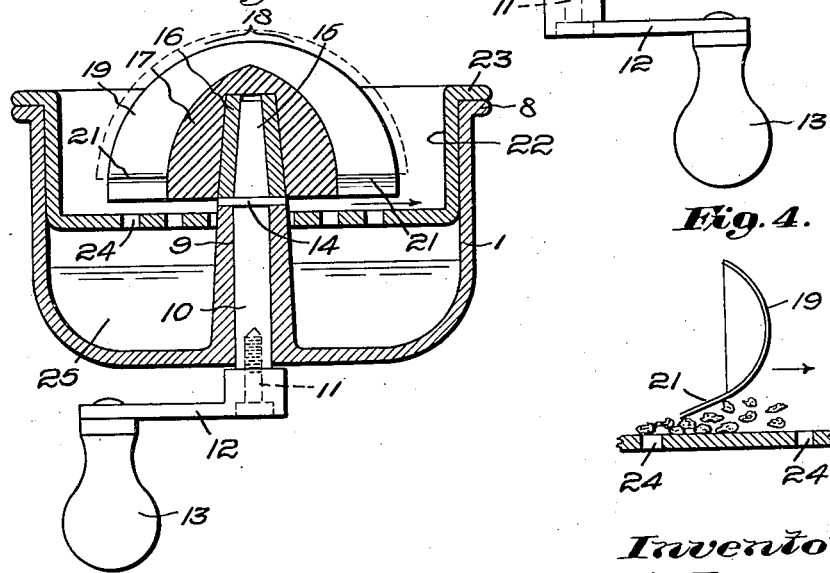
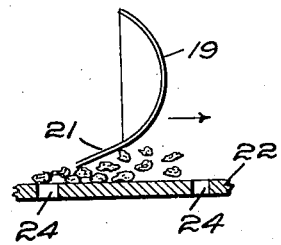
Inventor:
Knut Larson,
by Emery, Booth, Varney & Townsend
Attys Patented May 1, 1934

1,957,346

UNITED STATES PATENT OFFICE 1,957,346

FRUIT JUICE EXTRACTOR

Knut Larson, Pawtucket, R. I.

Application May 28, 1932, Serial No. 614,167

3 Claims. (Cl. 146—3)

This invention relates to fruit juice extractors and particularly to those that are hand operated and are used upon individual fruits, such as oranges and lemons, after cutting the same in half.

In order that the principle of the invention may be readily understood, I have disclosed a single embodiment thereof in the accompanying drawing, wherein—

Fig. 1 is a plan view of the entire device, supported in a bracket on a wall or other upright;

Fig. 2 is a vertical transverse section thereof, parts being shown in elevation;

Fig. 3 is a similar view taken at right angles to Fig. 2; and

Fig. 4 is a sectional detail of part of one of the blades, to illustrate the action thereof.

Referring more particularly to the drawing, the disclosed embodiment of the invention includes a container indicated at 1 and which may be of general bowl or cup shape. It is adapted to be held or supported in any suitable manner and is here shown as having a side or lateral extension 2 integral therewith and terminating in parallel edges or parts 3, 4 adapted to be slid into a suitable bracket, such as 5, the bracket itself being desirably permanently secured to a wall or other upright 6. The container may be of any suitable material, as, for example, some light metal such as aluminum or enamel ware. The invention, however, is not limited to the use of any particular material. The said container 1 is provided with a spout 7 and a flange 8 which is adapted to receive the strainer or extractor member proper. The said container is also provided with a preferably integral, central, tubular passage 9 to receive the shaft or spindle 10 that carries the rotatable member of the extractor. Said shaft 10 has secured thereto by a screw 11 a lever 12 having a handle 13 by which the device is operated.

The shaft 10 is shown as having formed therewith a collar 14, the shaft above or beyond said collar 14 being tapered as indicated at 15. The purpose of the taper is to prevent the part or member directly positioned thereon from rotating relative to the shaft 10. In this embodiment of the invention, I provide a conical or slightly tapering, preferably rubber member or sleeve 16 fitting tightly upon the tapered end 15 of the shaft 10. Received upon said tapering member or sleeve 16 is a cone 17, the same having a central socket or formation permitting it to fit tightly upon the rubber member or sleeve 16. Within the scope of my invention the cone 17 might be received directly upon the tapering end 15 of the shaft 10.

Overlying the sleeve 16 is the fruit extractor proper or reamer, indicated generally at 18. Said member 18 is desirably a unitary structure which may be, for example, of aluminum, but it may be of some suitable non-metallic material. Said member 18 has a number of blades 19 of a general spiral form, as indicated most clearly in Fig. 1, the said blades all meeting at their upper ends at the axis 20 of the member 18. Each blade 19 is desirably of arcuate form, being shown of a uniform or regular curve or slope down nearly to the lower end 21, where each blade is bent or deflected quite abruptly, as shown most clearly in Fig. 2 at 21. Such abruptly bent portion extends downward to the bottom of the member 18.

The device is also provided with an inner receptacle or cup-like member 22 of a diameter to fit within the container 1 and having a flange 23 to rest upon the rim of the container 1. Such inner receptacle 22 is provided with strainer openings 24 permitting the passage of the liquid as indicated at 25, the pulpy portions being retained above the openings 24. The deflected lower ends 21 extend close to the perforated bottom of the inner receptacle, as indicated in Fig. 4.

The provision of the abruptly deflected lower end of each blade or spiral 19 is an important feature of my invention. The action of such abruptly bent portion is to enhance and complete the crushing of the pulp and the extraction of all the liquid or juice therefrom, this being effected as indicated clearly in Fig. 4, where the pulp is represented as squeezed between said deflected ends 21 and the perforated bottom of the inner receptacle.

I am aware that fruit extractors have long been provided with blades of a general spiral form, but none of them so far as I am aware has been of such character as to effect the complete extraction of the liquid. Any suitable number of blades 19 may be employed. I have here represented six but a greater or a lesser number may be used within the spirit and purpose of the invention.

It will be understood that the handle is turned in such direction as to rotate the member 18 in the direction of the arrows in Figs. 1 and 2 to effect the juice extraction.

Having thus described one illustrative embodiment of the invention, it is to be understood that although specific terms are employed, they are used in a generic and descriptive sense, and not for purposes of limitation, the scope of the invention being set forth in the following claims.

I claim:

1. A fruit juice extractor comprising an outer receptacle having a central upright passage therethrough, a spindle mounted in said passage, a second receptacle supported within the outer receptacle and having a perforated bottom surrounding said tubular passage above the base of the outer receptacle, a rotatable conical member received upon said spindle within said second receptacle directly above said perforated bottom and having a set of blades of arcuate form substantially meeting at the top of said member and each extending downwardly to substantially the lower end thereof close to the said perforated bottom and there abruptly bent backwardly from the direction of rotation of said member to provide blade terminal portions of substantial width and length in close proximity to the perforations of the inner receptacle to serve to crush the pulpy portions of the fruit between said terminal portions and the said perforated bottom.

2. A fruit juice extractor comprising an outer receptacle 1 having a central passage 9, a spindle 10 supported in said passage, an inner receptacle supported by the wall of said outer receptacle and having a perforated bottom supported substantially above the base of the outer receptacle about said passage, a substantially conical rotatable member supported upon said spindle, said member having a series of spiral blades 19 upon which the fruit is to be placed in use, said blades 19 having their lower ends extending into close proximity to the perforated bottom of the inner receptacle and abruptly bent at 21 backwardly from the direction of rotation of said member and terminating close to said perforated bottom to provide blade terminal portions of substantial width and length to crush the pulpy portions of the fruit against said perforated bottom.

3. A fruit juice extractor comprising an outer receptacle 1 having a central upright passage 9, a spindle 10 mounted within said passage and having an operating handle at its lower end, said spindle having a collar 14 thereon, said spindle above said collar being tapered, a rubber sleeve 16 tightly fitted upon the tapered end of the spindle, and a conical member 17 centrally socketed and received directly upon the said rubber sleeve 16, said member 17 having a series of spiral blades 19 extending from the tip of the member to substantially the base thereof, each of said spiral blades being abruptly deflected at 21 backwardly from the direction of rotation of said member to provide blade terminal portions each of substantial width and length and an inner receptacle having a bottom in close proximity to said deflected lower ends 21 of the blades whereby the pulpy portions of the fruit are crushed between said terminal portions 21 and the bottom 22 of the receptacle.

KNUT LARSON.